United States Patent
Fleck et al.

(10) Patent No.: US 7,389,850 B2
(45) Date of Patent: Jun. 24, 2008

(54) POWER ASSISTED STEERING SYSTEM OF A MOTOR VEHICLE

(75) Inventors: Reidar Fleck, Dachau (DE); Tilo Meister, Munich (DE); Michael Glanzer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 22 days.

(21) Appl. No.: 11/432,519

(22) Filed: May 12, 2006

(65) Prior Publication Data

US 2006/0201737 A1    Sep. 14, 2006

Related U.S. Application Data

(63) Continuation of application No. PCT/EP2004/012641, filed on Nov. 9, 2004.

(30) Foreign Application Priority Data

Nov. 13, 2003 (DE) ................. 103 53 083
Nov. 13, 2003 (DE) ................. 103 53 084

(51) Int. Cl.
*B62D 5/04* (2006.01)
*B62D 6/00* (2006.01)

(52) U.S. Cl. ............................ 180/444; 180/446; 701/41

(58) Field of Classification Search ................. 180/410, 180/421, 422, 444, 446, 443; 701/41
See application file for complete search history.

(56) References Cited

U.S. PATENT DOCUMENTS 4,658,927 A * 4/1987 Kanazawa ............... 180/422
5,203,421 A * 4/1993 Ueno et al. ............... 180/417
5,205,371 A * 4/1993 Karnopp .................. 180/444
5,265,019 A * 11/1993 Harara et al. ............... 701/41
5,303,793 A * 4/1994 Kato et al. ................ 180/417
5,423,391 A * 6/1995 Shimizu ................... 180/446
5,853,064 A * 12/1998 Hackl et al. ............... 180/422
5,887,675 A * 3/1999 Hackl et al. ............... 180/422
6,102,151 A * 8/2000 Shimizu et al. ............ 180/446
6,446,749 B2 * 9/2002 Hackl et al. ............... 180/446
7,213,678 B2 * 5/2007 Park ........................ 180/444
2002/0029922 A1    3/2002 Richardson et al.
2005/0251310 A1 * 11/2005 Bohm ....................... 701/41

FOREIGN PATENT DOCUMENTS

| DE | 197 33 096 A1 | 2/1999 |
| DE | 100 32 340 A1 | 1/2002 |
| DE | 101 26 424 A1 | 12/2002 |
| JP | 08002429 A * | 1/1996 |

* cited by examiner

*Primary Examiner*—Lesley D. Morris
*Assistant Examiner*—Daniel Yeagley
(74) *Attorney, Agent, or Firm*—Crowell & Moring LLP

(57) ABSTRACT

An auxiliary power assisted steering system of a motor vehicle is provided. When a power limit for the system supplying the auxiliary power assist (or a limit for the specified steering angle) is exceeded, at least when considered over time, the gear ratio between the steering angle selected by the driver and the travel of the tie rod pivot point is adjusted to be more indirect in comparison with the preselected gear ratio. The superimposing unit may superimpose an additional steering angle acting in the opposite direction on the driver's steering angle, so that the displacement speed of the tie rod pivot point is reduced or the travel of the tie rod pivot point may be readjusted to the steering angle selected by the driver with a time delay.

18 Claims, 3 Drawing Sheets

POWER ASSISTED STEERING SYSTEM OF A MOTOR VEHICLE

CROSS REFERENCE TO RELATED APPLICATIONS

This application is a continuation application of International Patent Application No. PCT/EP2004/012641, filed on Nov. 9, 2004, and claims priority under 35 U.S.C. § 119 to German Patent Application Nos. 103 53 083.5 filed Nov. 13, 2003 and 103 53 084.3 filed Nov. 13, 2003. The entire disclosure of the aforementioned documents is herein expressly incorporated by reference.

BACKGROUND AND SUMMARY OF THE INVENTION

The present invention relates to a power assisted steering system of a motor vehicle, having a steering gear for converting the driver's intended steering, based on his steering maneuver, into a displacement movement of the tie rods assigned to the steerable wheels and having a superimposing unit with which an additional steering angle in the same direction or in the opposite direction can be superimposed on the steering angle selected by the driver so that the gear ratio between the steering angle selected by the driver and the travel of the rod pivot point on the steering gear is variable with respect to the gear ratio selected by the steering gear. With regard to the technical background, reference is made to German patent document Nos. DE 100 32 340 A1 and DE 101 26 424 A1.

Steering, i.e., driving the steerable wheels of a motor vehicle, requires force, i.e., power. This is particularly true of the lower rotational speed of the wheels being steered. The greatest power demand thus occurs in parking a vehicle with the wheels braked, i.e., when the steerable wheels are braked and are thus blocked to prevent them from rotating while at the same time being driven, i.e., steered. Furthermore, the power demand is especially high in the range of the two possible end positions, i.e., close to the maximum possible wheel angle, because, among other things, the lateral strain in the wheel tire increases with an increase in the wheel steering angle.

Steering systems and/or mechanical steering gears are usually designed so that the overall ratio becomes more direct in proximity to the end position, i.e., with rack-and-pinion steering in the area of the end positions of the rack travel, so the total steering angle applied by the driver of the vehicle to the steering wheel (steering maneuver) is limited to a reasonable level from one end position to the other. In addition, the tie rod forces increase greatly with an increase in steering angle owing to the change in gear ratio in the tie rods. Both result in an especially high power demand in the end positions of the rack travel (in the case of rack steering).

In conventional power assisted steering systems, the auxiliary power is applied mainly hydraulically. However, auxiliary power systems using electric motors are also known. Regardless of which auxiliary power system is installed, larger dimensions of the auxiliary power assist are necessary because of the great power demand of an auxiliary power steering system, especially in the end positions of the rack travel and/or in the range of large steering angles (near the respective end position). Thus, powerful motors or hydraulic pumps must be provided, and their drive in turn has a high energy demand, so the burden goes to the energy balance, i.e., consumption by the drive unit of the motor vehicle, since this usually drives (directly or indirectly) the unit that supplies the auxiliary power for the steering system.

One possible remedy for this problem is described in German Patent DE 101 26 424 A1, according to which the steering ratio is designed to be more indirect in the end positions, so that the unit supplying the auxiliary power for the steering system (a so-called "servo device") can be designed with the smallest possible dimensions. In the case of rack steering, a lower steering ratio in the end positions results in a lower rack travel per unit of steering angle selected by the driver by using the steering wheel or the like, so that logically a lower power is then required. However, as a direct result of such a steering ratio design, the steering angle range on the driver's steering wheel is increased when the steerable wheels are to be steered, e.g., from one end position to the other end position. To reduce this consequence which is uncomfortable for the driver while at the same time supplying the most indirect possible steering in the range of the zero position of the steering wheel, i.e., when driving straight ahead, according to DE 101 26 424 A1, the design of the steering gear is such that a relatively direct gear ratio is provided in an intermediate range between the zero position and the respective end position. The curve of the gear ratio, i.e., the rack travel (which is the travel of the tie rod pivot point on the steering gear) as a function of the steering angle selected by the driver with his steering wheel therefore has first an ascending area (starting from the zero position) and then has a descending area (at larger steering angles).

It has been found that a relatively direct steering ratio is still required in the range of the straight ahead position of the steering wheel, even with the known measure described here, if the total steering angle that must be applied to the steering wheel by the driver is to be kept within a reasonable size. One disadvantage of this is that in the range of the zero position, the steering should have a certain indirectness to be able to avoid extreme steering of the vehicle at small steering angles and thus ensure adequate stability. Another disadvantage of this known system according to German patent document No. DE 101 26 424 A1 is the fact that the gear ratio of the steering gear is represented fixedly (i.e., mechanically) in the rack contour, so it is impossible to implement different gear ratio curves.

In addition, steering systems with a so-called superpositioning unit are known. Such systems are capable of superimposing an extra steering angle acting either in the same direction or in the opposite direction upon the steering angle selected by the driver using the steering wheel (his steering maneuver in general). For example, this superimposing unit may be a servo motor having a planetary gear, whose first input is connected to the driver's steering wheel, whose second input is connected to a worm gear drive driven by the electric servo motor and whose output is mechanically connected to the input of the steering gear. Thus an additional steering angle can be adjusted via the electric motor with the worm gear drive and is then relayed to the steering gear.

For such a steering system the present invention provides a measure with the help of which the maximum power demand for driving the steerable vehicle wheels, which is especially high in the vicinity of both end positions, as already described above, and can be reduced without having to accept any great disadvantages.

The method of achieving this is characterized in that when a power limit for the system supplying the auxiliary power assist or a limit value for the steering angle specification is exceeded, at least when considered over time, the gear ratio between the steering angle selected by the driver and the travel of the rack pivot point on the steering gear is adjusted to be more indirect in comparison with the specified gear ratio.

In accordance with the present invention one of the measures to be described in greater detail below for reducing the power demand of the auxiliary power assist shall be implemented only as needed, i.e., essentially as a function of the power currently required from the unit supplying the auxiliary power assist. A comparison may be performed with a threshold value or a limit value (preferably specified), although that is not absolutely necessary. A measure for reducing the power demand may be implemented even if it is to be expected that a power limit is exceeded. However, if a concrete threshold value for the power demand is specified, it is preferably selected in such a way that it is reached only in extreme situations, e.g., in a parking operation with a very rapid steering to high friction value. Only if this threshold value is reached and/or exceeded is a measure for reducing the power demand initiated.

Initiating a measure for reducing the power demand on exceeding a limit value for the specified steering angle also goes in the same direction. Whenever the driver selects with his steering maneuver, in particular the steering wheel, a particularly large steering angle (or steering wheel angle) which is above a limit that has been set as suitable (and thus fundamentally requires a particularly high power for implementation), a measure for reducing the power demand is initiated.

In accordance with exemplary embodiments of the present invention a measure for reducing the power demand includes adjusting the gear ratio between the steering angle selected by the driver and the travel of the rack pivot point on the steering gear to be more indirect in comparison with a gear ratio specified by the steering gear, at least when considered over time. A more indirect gear ratio results in a reduced power demand. Then the displacement rate of the tie rod pivot point on the steering gear in comparison with the rate of change of the specified steering angle is reduced in the sense of a more indirect gear ratio by the fact that the aforementioned superimposing unit superimposes an additional steering angle in the opposite direction on the steering angle selected by the driver, i.e., the so-called superimposed steering adjusts a more indirect steering ratio after said limit value (power limit or steering angle limit) has been exceeded and thus in the case of rack steering, the rack traveling speed is lowered with no change in the intended steering angle speed. This avoids a need for maximum power, but it causes the required steering angle to be increased by the amount of the superimposed additional steering angle up to the end position of steering.

In the application of an inventive system, it is important to be sure that the driver steers back into the straight-ahead position along the same gear ratio curve in the return motion of his steering wheel (his steering maneuver in general) as in the original steering motion because otherwise the steering wheel is skewed at the height of the additional steering angle. Furthermore, the fact that the driver need not apply the same steering angle up to the steering stop position in all situations, depending on the power demand, so complete reproducibility is not obtained. Therefore, the maximum possible steering angle difference should not be perceived by the driver as causing interference. A design criterion for this function is thus a certain additional required steering angle demand.

Another possibility for reducing the power demand on the tie rods due to a lower travel speed of the rack of the steering gear or the like is by using a time-delay element in the controlled system. This function is very similar to the power-dependent steering ratio because at least when considered over time an indirect steering ratio is set. In accordance with the present invention the steering angle on the steerable vehicle wheels is delayed with respect to the steering movement or steering specification of the driver on reaching a certain power demand (i.e., the aforementioned power limit) or on exceeding a limit value for the specified steering angle (selected by the driver) and thus to build up the steering angle with a delay, i.e., on exceeding said limit value, the travel of the tie rod pivot point is readjusted with a time delay to the steering angle selected by the driver. The advantage of this function in comparison with the power-dependent steering ratio consists of the fact that the steering angle remains unchanged until reaching the (mechanical) steering stop. Depending on the time delay, the rack travel speed and thus the power demand on the tie rods may be reduced by a certain measure.

In accordance with exemplary embodiments of the present invention, the steering wheel angle and the steering angles on the steerable vehicle wheels are established independently of one another in principle, and the steering wheel is to reach the stop before the end of the steering operation on the wheel, so it may be advisable to provide an additional actuator or the like for displaying the steering stop in the steering column, for example, and/or with effect on the driver's steering wheel. This function may be taken over by an electric steering lock, for example.

As already explained, these measures should be initiated only on reaching or exceeding a limit value or threshold value for the steering wheel angle and/or the specified steering angle or for the power demand by the unit supplying the auxiliary power assist. Whether the limit value or threshold value is exceeded can be estimated from the respective profile of requirements or it is possible to ascertain in concrete terms that a power threshold has been reached. For example, to calculate the total power in the tie rods in the case of an electromagnetic servo steering (auxiliary power assist), the current consumed by the respective electric motor can be measured. In the case of a hydraulic steering assist, a suitable sensor system, e.g., in the form of wire strain gauges may be provided on the tie rods. If necessary, the current consumption by the superimposing unit which is driven by electric motor (superimposing steering) may also provide information regarding the power ratios in the tie rods and/or on the rack or the like of the steering gear.

In the sense of an estimate as to whether or not a power limit for the auxiliary power assist has been exceeded or will be exceeded, suitable measures to reduce the power demand may also be initiated in certain operating states. Such a measure will be taken when a reduction in power demand is in fact necessary, e.g., in a parking procedure. This can be described, for example, by the fact that the driving speed of the vehicle is less than 5 km/h. Furthermore, for example, steering when the vehicle is standing still and the wheels are braked and when the power demand is naturally high likewise represents an operating state in which a proposed change in the gear ratio is implemented, i.e., an additional steering angle in the opposite direction is superimposed in particular when the driver specifies a large steering angle; this is done in order to obtain a more indirect steering ratio.

Furthermore, in accordance with exemplary embodiments of the present invention the steering ratio is implemented essentially only in such a range in which an indirect setting will result in a relatively great reduction in power demand. Then in certain states or operating states at steering angles selected by the driver, which are above an intended steering angle that is essentially in the middle in the range between an intended steering angle of 0° and the maximum selectable steering angle, the travel of the tie rod pivot point on the steering gear which is executed at a preselected angle unit is reduced with an increase in the intended steering angle by superimposing of additional steering angles directed in the opposite direction. To reduce the steering demand on the steering gear, the steering ratio in the steering gear is designed to be more indirect but only in such areas and such operating states in which the power demand is or would otherwise be disproportionately high. In the area close to the end positions with the high power demand described above, the gear ratio is set to be more indirect by specifying a negative superimposed steering angle. The gear ratio curve thus has a falling section near the end positions and therefore reduces the power demand. This range with the "falling" section close to the end positions can also be described by the fact that it is above an essentially middle intended steering angle in the range between an intended steering angle of 0° and the maximum selectable steering angle.

In addition, the steering ratio may be set to be somewhat more direct in the area around the zero position (i.e., straight-ahead setting) in these certain operating states by adjusting positive superimposed steering angles by the superimposing unit because the measure described so far, namely to reduce the travel of the tie rod pivot point (on the steering gear) executed for each steering angle unit (preselected by the driver) by superimposing additional steering angles in the opposite direction (for relatively large steering angles in certain operating states and to thereby obtain a more indirect steering ratio), initially results in a larger total steering angle on the steering wheel from one stop to the next, but this is undesirable for comfort reasons, and this is preferably done in such a way that the required driver's steering angle remains essentially unchanged on the whole from one end position to the next.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
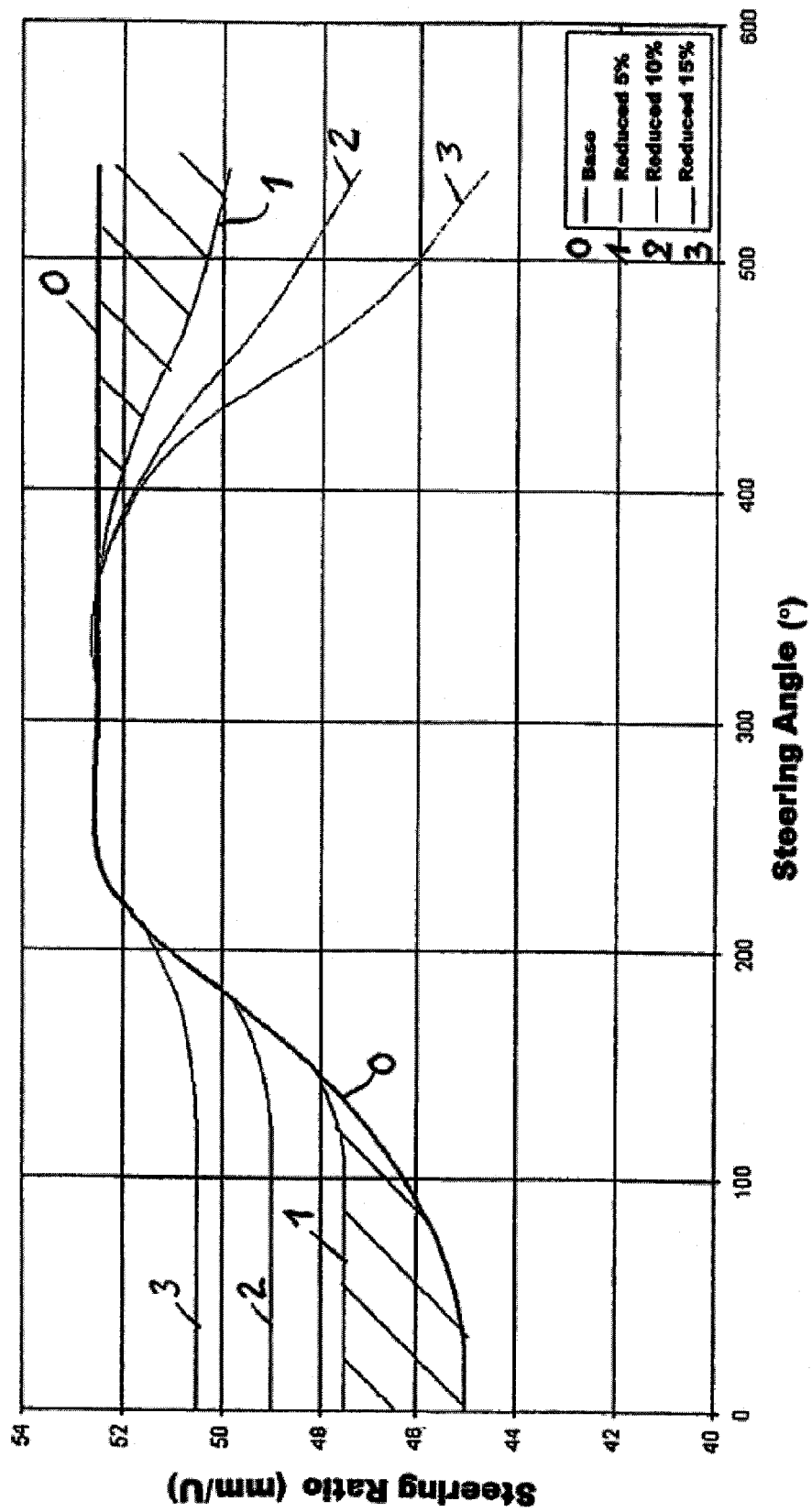
FIG. 1 shows as an example possible steering ratios, represented as the travel of the tie rod pivot point (in mm/°) as a function of the steering angle (in°) selected by the driver using the steering wheel.

FIG. 1 shows only one half, namely the area starting from the zero position of the steering wheel (i.e., straight-ahead setting, 0°) up to a maximum positive steering angle of approximately 540°. The curve labeled with reference number "0" represents the basic design of the gear ratio, i.e., a design which is valid for many operating states of the vehicle, which are not the "certain operating states" in the sense of the present invention.

Accordingly, the curve labeled with reference numeral "1" represents a steering ratio which has been reduced by 5% for high steering angles and thus causes a 5% reduction in the required power in comparison with the basic design (assuming the same steering angle speed on the driver's steering wheel). A steering ratio is adjusted accordingly in certain operating states by superimposing a suitable, oppositely directed additional steering angle for higher steering angles selected by the driver.

To obtain a total steering angle on the steering wheel that is unchanged from one stop to the next with the steering ratio according to curve "1" in comparison with a steering ratio according to basic curve "zero," the steering ratio is also set to be more direct in the area of the zero position through positive superimposed steering angles, because when considered from a mathematical standpoint, to meet this requirement the integral of these two curves 0, 1 must have the same value over the steering angle. This is the case when the hatched areas in the figure are of the same size. For comparison purposes, this also shows two other gear ratio curves 2, 3 with which an even greater power reduction by 10% to 15% can be achieved, but the spread in the gear ratio curve increases with a greater power reduction, which makes it difficult to achieve the desired steady transition to the basic gear ratio characteristic.

Figure 2:
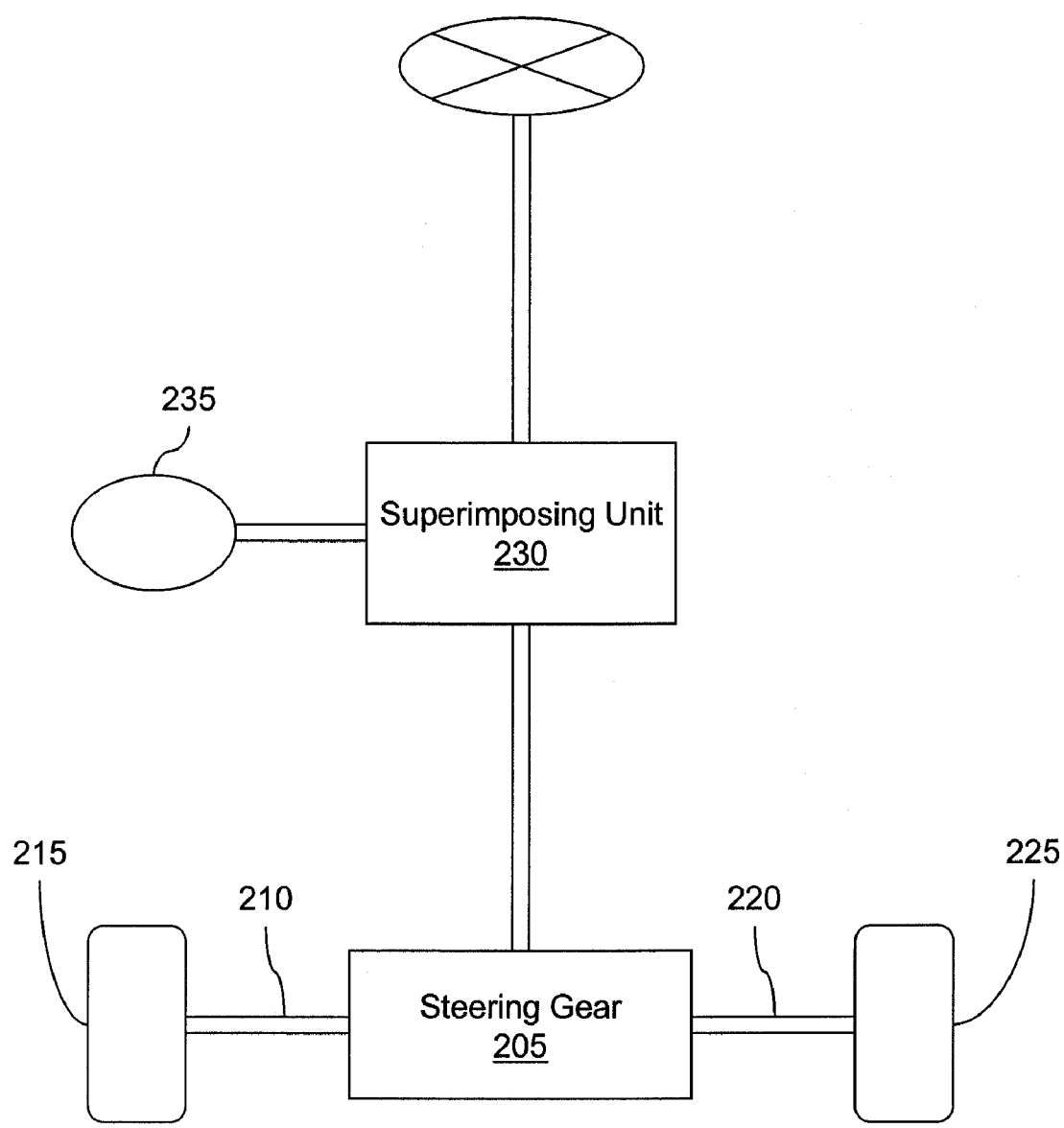
FIG. 2 shows an exemplary auxiliary power assisted steering system of a motor vehicle in accordance with the present invention.

FIG. 2 shows an exemplary auxiliary power assisted steering system of a motor vehicle in accordance with the present invention. The system includes a steering gear 205 for converting a driver's intended steering, based on the driver's steering maneuver, into a displacement movement of tie rods 210 and 220 assigned to the steerable wheels 215 and 225. The system also includes superimposing unit 230 with which an additional steering angle in the same direction as or the opposite direction from the steering angle selected by the driver can be superimposed on the latter, so that the gear ratio between the steering angle selected by the driver and the travel of the tie rod pivot point on the steering gear 205 is variable with respect to a gear ratio preselected by the steering gear 205.

When a power limit for the system supplying the auxiliary power assist 235 or a limit value for the steering angle selected by the driver is exceeded at least when considered over time, the gear ratio between the steering angle selected by the driver and the travel of the tie rod pivot point on the steering gear 205 is adjusted to be more indirect in comparison with the preselected gear ratio by the superimposing unit 230 superimposing an additional steering angle acting in the opposite direction on the steering angle selected by the driver so that the displacement speed of the tie rod pivot point is reduced in comparison with the speed of change of the intended steering angle, or by readjusting the travel of the tie rod pivot point with a time delay of the steering angle selected by the driver.

Current consumed by an electric motor 235 provided in the steering system is measured to detect when a power limit has been exceeded or a suitable force measurement sensor is provided on the tie rods. An operating state in which said change in gear ratio is implemented includes a vehicle parking operation or a driving speed below 5 km/h. Steering when the vehicle is at a standstill and the wheels 215 and 225 are braked is an operating state in which said change in the gear ratio is implemented.

In certain operating states at steering angles selected by the driver which are above an essentially medium intended steering angle in the range between an intended steering angle of 0° and the maximum preselectable steering angle, the travel executed per preselected unit of angle of the tie rod pivot point is reduced, with an increase in the intended steering angle, by superimposing additional steering angles directed in the opposite direction. The steering ratio in the range around the zero position is set to be more direct in these certain operating states by controlling positive additional steering angles by the superimposing unit to obtain a driver steering angle that does not differ significantly from that in other operating states from one stop to the next even in these certain operating states.

Figure 3:
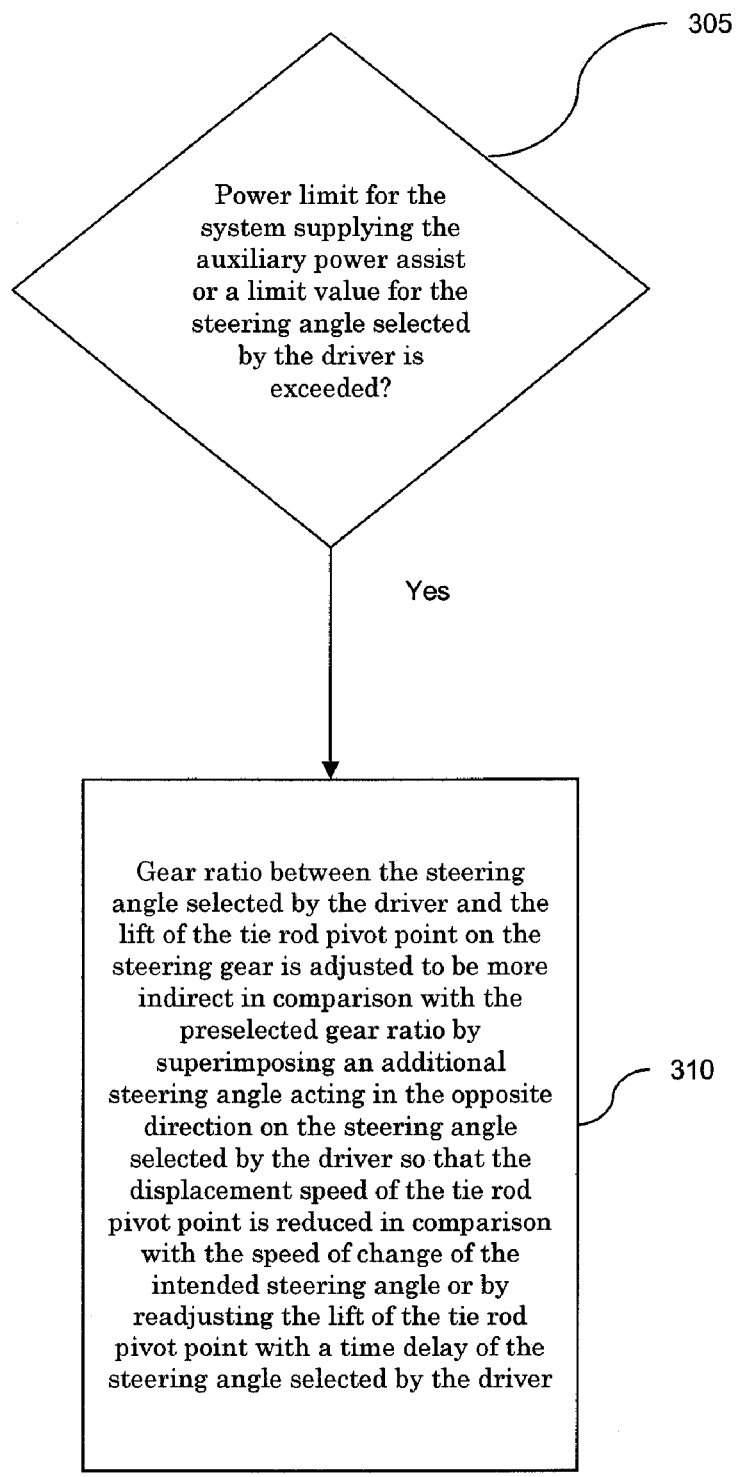
FIG. 3 shows an exemplary method in accordance with the present invention.

FIG. 3 shows an exemplary method in accordance with the present invention. When a power limit for the system supplying the auxiliary power assist or a limit value for the steering angle selected by the driver is exceeded ("Yes" path out of decision step 305), then the gear ratio between the steering angle selected by the driver and the lift of the tie rod pivot point on the steering gear is adjusted to be more indirect in comparison with the preselected gear ratio by superimposes an additional steering angle acting in the opposite direction on the steering angle selected by the driver so that the displacement speed of the tie rod pivot point is reduced in comparison with the speed of change of the intended steering angle or by readjusting the lift of the tie rod pivot point with a time delay of the steering angle selected by the driver (step 310).

Through the implementation of the functions described here, advantages are obtained with regard to the dimensioning of the unit supplying the auxiliary power assist, which is reflected in a lower space requirement, a lower weight and a lower power consumption. With steering assistance systems driven by the drive unit of the vehicle, a lower power is required, thus leading to savings in terms of consumption. Another important effect that should be mentioned is that smaller and more efficient steering assistance systems may be relied on due to the power reduction, and it should also be pointed out that a number of details can be embodied in deviation from the above discussion without going beyond the scope of the patent claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Auxiliary power assisted steering system of a motor vehicle comprising:
   a steering gear that converts a driver's intended steering, based on the driver's steering maneuver, into a displacement movement of tie rods assigned to steerable wheels; and
   a superimposing unit with which an additional steering angle can be superimposed on a steering angle selected by the driver, so that a gear ratio between the steering angle selected by the driver and travel of the tie rod pivot point on the steering gear is variable with respect to a gear ratio preselected by the steering gear,
   wherein when a power limit for a system supplying the auxiliary power assist or a limit value for the steering angle selected by the driver is exceeded, the gear ratio between the steering angle selected by the driver and the travel of the tie rod pivot point on the steering gear is adjusted to be more indirect in comparison with the preselected gear ratio by the superimposing unit superimposing an additional steering angle acting in the opposite direction on the steering angle selected by the driver so that a displacement speed of the tie rod pivot point is reduced in comparison with a speed of change of the steering angle selected by the driver, or by readjusting the travel of the tie rod pivot point with a time delay of the steering angle selected by the driver.

2. Steering system as claimed in claim 1, wherein current consumed by an electric motor provided in the steering system is measured to detect when a power limit has been exceeded or a suitable force measurement sensor is provided on the tie rods.

3. Steering system as claimed in claim 1, wherein an operating state in which said change in gear ratio is implemented includes a vehicle parking operation or a driving speed below 5 km/h.

4. Steering system as claimed in claim 1, wherein steering when the vehicle is at a standstill and the wheels are braked is an operating state in which said change in the gear ratio is implemented.

5. Steering system as claimed in claim 1, wherein at least in certain operating states at steering angles selected by the driver which are above an essentially medium intended steering angle in the range between an intended steering angle of 0° and the maximum preselectable steering angle, the travel executed per preselected unit of angle of the tie rod pivot point is reduced, with an increase in the intended steering angle, by superimposing additional steering angles directed in the opposite direction.

6. Steering system as claimed in claim 1, wherein the steering ratio in the range around the zero position is set to be more direct in these certain operating states by controlling positive additional steering angles by the superimposing unit to obtain a driver steering angle that does not differ significantly from that in other operating states from one stop to the next even in these certain operating states.

7. A method for an auxiliary power assisted steering system of a motor vehicle including a steering gear that converts the driver's intended steering, based on his steering maneuver, into a displacement movement of tie rods assigned to steerable wheels, and a superimposing unit with which an additional steering angle can be superimposed on a steering angle selected by the driver, so that a gear ratio between the steering angle selected by the driver and travel of the tie rod pivot point on the steering gear is variable with respect to a gear ratio preselected by the steering gear, the method comprising the acts of:
   adjusting the gear ratio between the steering angle selected by the driver and the travel of the tie rod pivot point on the steering gear, when a power limit for the system supplying the auxiliary power assist or a limit value for the steering angle selected by the driver is exceeded, to be more indirect in comparison with the preselected gear ratio by superimposes an additional steering angle acting in the opposite direction on the steering angle selected by the driver so that a displacement speed of the tie rod pivot point is reduced in comparison with a speed of change of the steering angle selected by the driver or by readjusting the travel of the tie rod pivot point with a time delay of the steering angle selected by the driver.

8. A method as claimed in claim 7, wherein the current consumed by an electric motor provided in the steering system is measured to detect when a power limit has been exceeded or a suitable force measurement sensor is provided on the tie rods.

9. A method as claimed in claim 7, wherein an operating state in which said change in gear ratio is implemented includes a vehicle parking operation or a driving speed below 5 km/h.

10. A method as claimed in claim 7, wherein steering when the vehicle is at a standstill and the wheels are braked is an operating state in which said change in the gear ratio is implemented.

11. A method as claimed in claim 7, wherein at least in certain operating states at steering angles selected by the driver which are above an essentially medium intended steering angle in the range between an intended steering angle of 0° and the maximum preselectable steering angle, the travel executed per preselected unit of angle of the tie rod pivot point is reduced, with an increase in the intended steering angle, by superimposing additional steering angles directed in the opposite direction.

12. A method as claimed in claim 7, wherein the steering ratio in the range around the zero position is set to be more direct in these certain operating states by controlling positive additional steering angles by the superimposing unit to obtain a driver steering angle that does not differ significantly from that in other operating states from one stop to the next even in these certain operating states.

13. Auxiliary power assisted steering system of a motor vehicle comprising:

first and second steerable wheels;

first and second tie rods respectively coupled to the first and second steerable wheels;

a steering gear, coupled to the tie rods, that converts a steering angle selected by a driver into a displacement movement of the tie rods;

a superimposing unit, coupled to the steering gear, a component that provides the steering angle selected by the driver and a motor, wherein the superimposing unit superimposes an additional steering angle provided by the motor on the steering angle selected by the driver, wherein when a power limit for the motor or a limit value for the steering angle selected by the driver is exceeded, the superimposing unit superimposing an additional steering angle acting in an opposite direction on the steering angle selected by the driver so that a displacement speed of the tie rod pivot point is reduced in comparison with a speed of change of the steering angle selected by the driver.

14. Steering system as claimed in claim 13, wherein current consumed by the motor is measured to detect when a power limit has been exceeded or a suitable force measurement sensor is provided on the tie rods.

15. Steering system as claimed in claim 13, wherein an operating state in which said change in gear ratio is implemented includes a vehicle parking operation or a driving speed below 5 km/h.

16. Steering system as claimed in claim 13, wherein steering when the vehicle is at a standstill and the wheels are braked is an operating state in which said change in the gear ratio is implemented.

17. Steering system as claimed in claim 13, wherein at least in certain operating states at steering angles selected by the driver which are above an essentially medium intended steering angle in the range between an intended steering angle of 0° and the maximum preselectable steering angle, the travel executed per preselected unit of angle of the tie rod pivot point is reduced, with an increase in the intended steering angle, by superimposing additional steering angles directed in the opposite direction.

18. Steering system as claimed in claim 13, wherein the steering ratio in the range around the zero position is set to be more direct in these certain operating states by controlling positive additional steering angles by the superimposing unit to obtain a driver steering angle that does not differ significantly from that in other operating states from one stop to the next even in these certain operating states.

* * * * *